Oct. 10, 1939.                K. E. BEMIS                 2,175,500
              CONVERTIBLE COOKING AND SERVING UNIT
                       Filed June 1, 1937

Inventor
Kenneth E. Bemis
per Philip A. Friedell
       Attorney

Patented Oct. 10, 1939

2,175,500

UNITED STATES PATENT OFFICE 2,175,500

CONVERTIBLE COOKING AND SERVING UNIT

Kenneth E. Bemis, Oakland, Calif.

Application June 1, 1937, Serial No. 145,756

5 Claims. (Cl. 53—7)

This invention, a convertible cooking and serving unit consists of a plurality of individual griddles which are comparatively shallow, and two receptacles for butter and jelly or similar substances, and a holder or frame in which the griddles and receptacles are placed to form a complete service after certain of the foods have been cooked in the griddles, thereby serving the natural juices of the food, such as steaks, directly to the customer.

The objects and advantages of the invention are as follows:

First; to provide a system of food service in which the foods, such as steaks, are cooked and served in the same receptacle, so as to serve all of the natural juices directly to the customer.

Second; to provide a combination unit including a frame and a plurality of receptacles or dishes, in which said receptacles initially function as griddles for cooking meats and other foods, and secondly as serving dishes when they are placed in and supported by the frame.

Third; to provide a unit as outlined in which the depth of the griddles is about one third to one fourth the height of the frame, and in which the peripheral wall of the frame is perpendicular to a support and imperforate, and the tops of the griddles are supported in the top of the bottomless frame, to provide the illusory effect of a deep dish of food and a generous serving.

Fourth; to provide a unit as outlined with a bottomless frame with peripheral walls perpendicular to the top and terminating at the bottom in a continuous plane so as to serve as an air trap in conjunction with a support, such as a table, to form a dead air space between the undersurface of griddles supported in the top of the frame and the support, for maintaining the heat in the cooked foods in the griddles.

Fifth; to provide a unit as outlined with a frame in which the griddles and receptacles are substantially coextensive with the top of the frame, so as to provide the effect of a maximum helping or serving of food.

Other objects and advantages of the invention will become apparent as the following description is read on the drawing forming a part of this specification, and in which similar reference characters are used to designate similar parts throughout the several views, of which:

Figure 1:
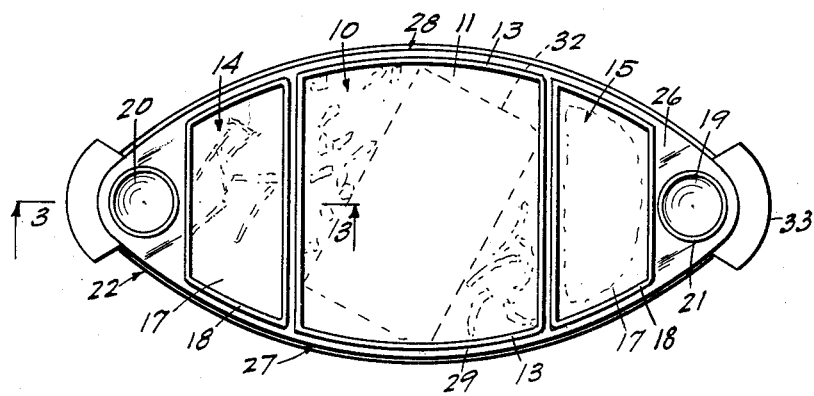
Fig. 1 is a plan view of the invention.
Figure 2:
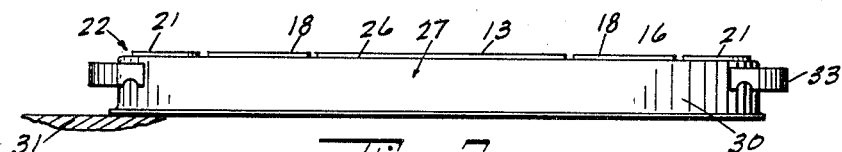
Fig. 2 is a front elevation of Fig. 1.
Figure 3:
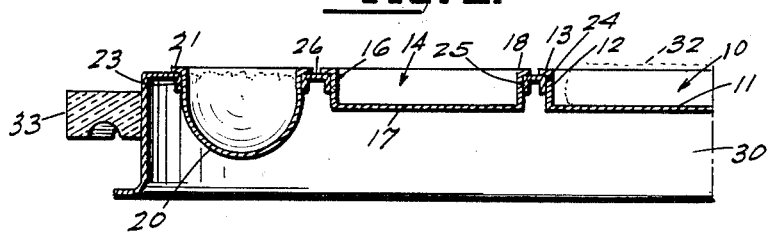
Fig. 3 is an enlarged sectional elevation taken on a line 3—3 of Fig. 1.

The invention consists of a main griddle 10 having a flat bottom 11 and perpendicular peripheral walls 12 terminating at their upper ends in a narrow supporting flange 13 by which the griddle is supported in the frame; two side griddles 14 and 15 serving as side dishes for toast, vegetables and other foods, and having perpendicular peripheral walls 16, a flat bottom 17 and supporting flange 18.

In addition to these griddles, two cups 19 and 20 are formed with supporting flanges 21, and these cups form services for butter, jelly and similar substances.

The frame 22 is a bottomless housing and is preferably formed substantially elliptical in plan as shown, to cause the periphery of the frame to uniformly conform to the griddles of suitable width and the receptacles or cups of comparatively small diameter, and these cups are supported in openings formed in the top of the frame adjacent the ends as shown at 23, while the griddles 10, 14 and 15 are supported in openings 24, 25, the flanges 13, 16 and 18 and 21 resting on the top wall 26 of the frame, and the front and back walls and flanges conforming to the peripheral contour of the frame, extending close to the front 27 and back 28 of the frame.

Only a small margin 29 is left between the edges of the receptacles and the periphery of the frame, providing a completely filled serving dish.

The set of griddles and receptacles being substantially coextensive with the top of the frame, as shown provides the appearance of a serving dish filled to its utmost limit, there being no broad rims or flanges as is the case in usual types of plates to provide the effect of a sparse serving, and a gratifying effect as thereby produced.

The peripheral wall 30 of the frame has a height several times that of the depth of the griddles, and are formed perpendicular to a support 31 such as a table, a suitable height being from three to four times the depth of the griddles, to produce a suitable effect of depth to the griddles.

The peripheral wall 30 is imperforate, and the lower edge of the wall rests throughout its peripheral extent directly on the support so as to entrap air in the interior of the frame to form a dead air space about the sides and bottoms of the griddles, thus supporting the hot griddles out of contact with the support 31 or table, and through the medium of the dead air space, maintaining the foods warm.

As will be noted, the griddles are made of a depth about equal to the thickness of an ordinary cut of steak or meat patty 32, and the remaining portions of the center grill and the side grills are filled with other foods, and all of these grills are filled to the top and sides, providing an unusually appetizing and aesthetic display.

The perpendicular, imperforate sides of the frame provide the illusory effect of a deep dish of food, which illusory effect is entirely absent where the walls slope in or out as in the case of plates and other types of dishes, and thus an entirely new result is secured thereby. The two straight sides of the griddles permit them to be urged against the back of the stove, preventing rotation while foods are being turned over with a spatula.

In addition, steaks, meat patties, wieners, eggs and other similar foods are fried directly in these griddles and the griddles are then placed in the frame by means of the usual spatula (the griddles having no handles), and the entire meal, exclusive of drinks and dessert, is served in a single unit.

Bakelite or similar handles 33 are provided for the opposite ends of the frame, and the griddles initially function as cooking devices and secondly as plates or serving devices.

It will be understood that variations in construction and arrangement of parts, which variations are consistent with the appended claims, may be resorted to without detracting from the spirit or scope of the invention, or sacrificing any of the advantages thereof.

I claim:

1. A convertible cooking and serving unit comprising a bottomless frame having a flat top and imperforate perpendicular peripheral wall with the ends of the frame formed to circular shape of short radius; a plurality of trays serving initially as cooking dishes and secondly as serving dishes and having flanges for removable support in openings formed in said flat top, said trays forming closures to form a dead air space within the frame between its supporting surface and the trays to maintain the heat of the food in the trays and prevent scorching of said surface, said trays being substantially coextensive with said top and having perpendicular side walls to prevent movement within the frame when foods are being cut or removed therefrom during eating of the foods, said flanges forming very narrow margins between the trays, and between the trays and the peripheral walls to provide the effect of a completely filled tray and a generous helping, and a handle secured about each end of the frame and conforming to the circular shape thereof to provide for convenient handling and serving of a complete meal on the dish.

2. A convertible cooking and serving unit comprising a skeleton frame having depending, uninterrupted imperforate side walls and a plane top provided with dish receiving openings; shallow removable dishes having peripheral flanges for support by said top in said openings and having perpendicular side walls for anchorage against movement when mounted in said frame and functioning selectively and successively as griddles for cooking the food, and serving plates for direct serving of the food after cooking and being in combination substantially coextensive with said top for minimum space requirements for the unit; said serving plates forming closures for the top to form a dead-air space between the plates and a supporting surface for the frame.

3. A convertible cooking and serving unit provided at each end with a serving handle for combined function of the unit selectively as a serving tray and a serving dish, and in which said unit comprises a skeleton frame having depending side walls and a plane top provided with dish receiving openings, and compartments comprising removable dishes supportable in said openings in spaced relation to a supporting surface for the frame and functioning successively and selectively as griddles for cooking foods when removed from the frame, and as plates when supported in the openings in the frame, and being in combination, substantially coextensive with said top for minimum space requirements for the unit relative to the space requirements of the removable dishes, and having perpendicular side walls for immovability relative to said frame, whereby when the foods are cut or removed from the dish during eating of the foods, sliding or tipping of the dish is completely obviated.

4. A convertible cooking and serving unit comprising a bottomless skeleton frame having perpendicular peripheral imperforate walls and a plane top and provided with a pair of handles for function as a serving tray; said top having dish-receiving openings formed therein, and shallow dishes removably fitting said openings and having a depth less than the height of said walls and having flanges for support on said top and functioning to seal said top and being removable and replaceable at will to initially function as griddles for cooking foods when removed from the frame, and converted secondly into plates for serving the foods cooked, directly and without transfer, through assembly of the griddles in said frame, said plates having perpendicular side walls to prevent movement thereof relative to said frame, and said unit providing a combined serving tray and compartment dish with dead-air space between the bottoms of said dishes and a supporting surface for the frame to maintain the heat of the foods and prevent scorching of the supporting surface by the hot dishes.

5. A culinary device comprising a frame having handles and a plane top provided with griddle-receiving openings; a shallow, flat-bottom dish having perpendicular walls and fitting each opening and having a height less than the height of said frame and having an encompassing flange for supporting the dish in the opening; said dishes being formed of heat-resistant material and functioning successively as griddles for cooking and heating foods on a stove, and, for service of the cooked or heated foods directly in the griddles which are thereby converted into serving dishes by assembly in the frame; said frame acting successively as a holder for the griddles, a compartment serving tray, and, a compartment dish, for the preparation and service of a meal, said perpendicular side walls preventing movement or tipping of the dishes when food therein is operated upon during the eating of a meal.

KENNETH E. BEMIS.